United States Patent [19]

Peveler

[11] Patent Number: 6,099,016
[45] Date of Patent: Aug. 8, 2000

[54] LANDING GEAR

[75] Inventor: Michael W. Peveler, Montgomery City, Mo.

[73] Assignee: The Binkley Company, Warrenton, Mo.

[21] Appl. No.: 08/897,928

[22] Filed: Jul. 21, 1997

[51] Int. Cl.⁷ .................................................. B60D 13/00
[52] U.S. Cl. ...................... 280/475; 280/763.1; 254/419; 254/424
[58] Field of Search ................................ 280/762, 763.1, 280/765.1, 766.1, 475; 254/419, 420, 422, 424, 425; 248/352, 354.1, 354.5

[56] References Cited

U.S. PATENT DOCUMENTS

| | | | |
|---|---|---|---|
| 2,565,401 | 8/1951 | Smith | 254/103 |
| 3,595,527 | 7/1971 | Douglass | 254/86 |
| 4,187,733 | 2/1980 | Walther et al. . | |
| 4,635,904 | 1/1987 | Whittingham | 254/425 |
| 4,796,864 | 1/1989 | Wilson | 254/425 |
| 4,824,136 | 4/1989 | Baxter . | |
| 4,903,977 | 2/1990 | Baxter . | |
| 5,423,518 | 6/1995 | Baxter et al. . | |
| 5,470,096 | 11/1995 | Baxter . | |

OTHER PUBLICATIONS

Holland Binkley brochure entitled "New FG4000 Fast-Gear™ Fastest to the Ground Offers Four–Way Savings"; copyright 1996; 4 pages.
Holland Binkley brochure entitled "Challenger™ Model 50,000 Landing Gears"; Copyright 1992; 4 pages.
Holland Binkley brochure entitled "Contender Model 51,000 Landing Gear with an Additional 15 lb. Weight Savings"; Copyright 1993; 4 pages.

*Primary Examiner*—Matthew C. Graham
*Assistant Examiner*—Pamela J. Lipka
*Attorney, Agent, or Firm*—Senniger, Powers, Leavitt & Roedel

[57] ABSTRACT

Landing gear for supporting a vehicle including a body for attachment to the vehicle, and a tubular leg carried by the body and having a sliding fit with the body for up and down movement relative to the body. The landing gear further includes a mechanism for slidably moving the leg up and down relative to the body. The mechanism includes a nut inside the tubular leg having a threaded bore, an upper bulkhead extending across the inside of the leg adjacent the upper end of the leg, and a lower bulkhead extending across the inside of the leg below the upper bulkhead for supporting the nut in a generally fixed position relative to the leg between the upper and lower bulkheads. Both the upper and lower bulkheads include openings aligned with the threaded bore of the nut. The mechanism also includes a screw shaft in threaded interconnection with the threaded bore of the nut and extending axially in the tubular leg, and a bearing in the body above the leg journalling the screw shaft for rotation on its axis. The screw shaft extends downward from the bearing through the nut and through the openings in the upper and lower bulkheads so that rotation of the screw shaft in one direction is operable to move the leg upward relative to the body and rotation of the screw shaft in an opposite direction is operable to move the leg downward relative to the body.

18 Claims, 5 Drawing Sheets

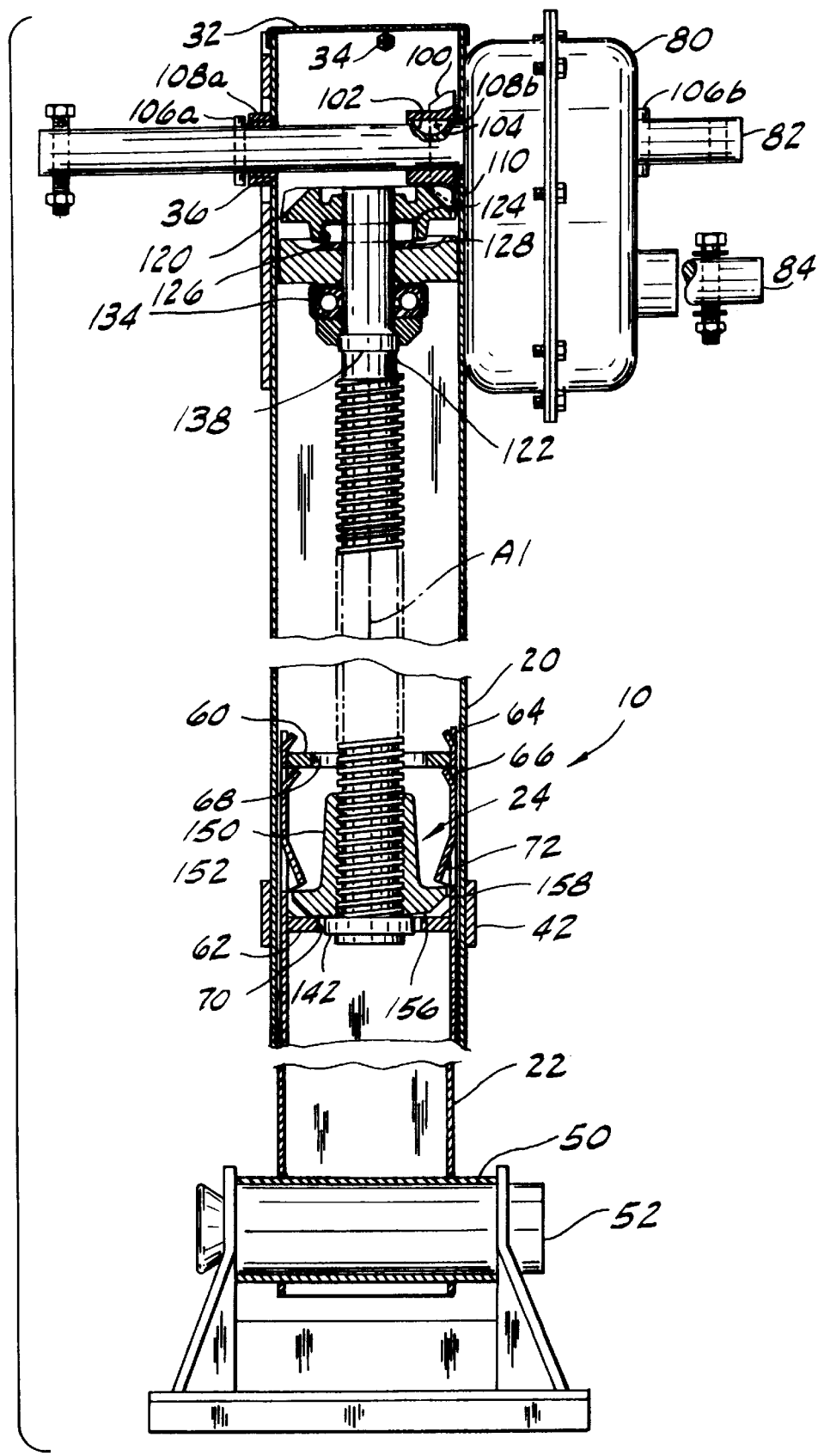

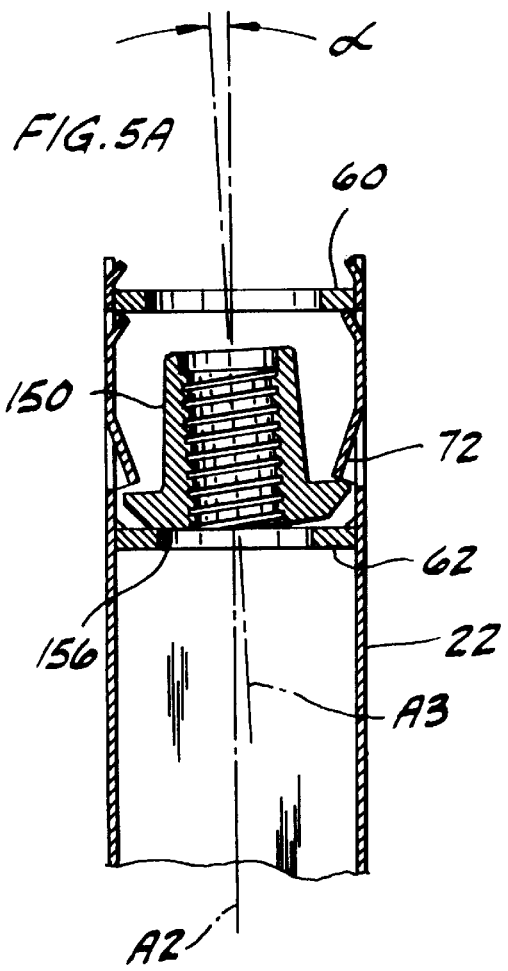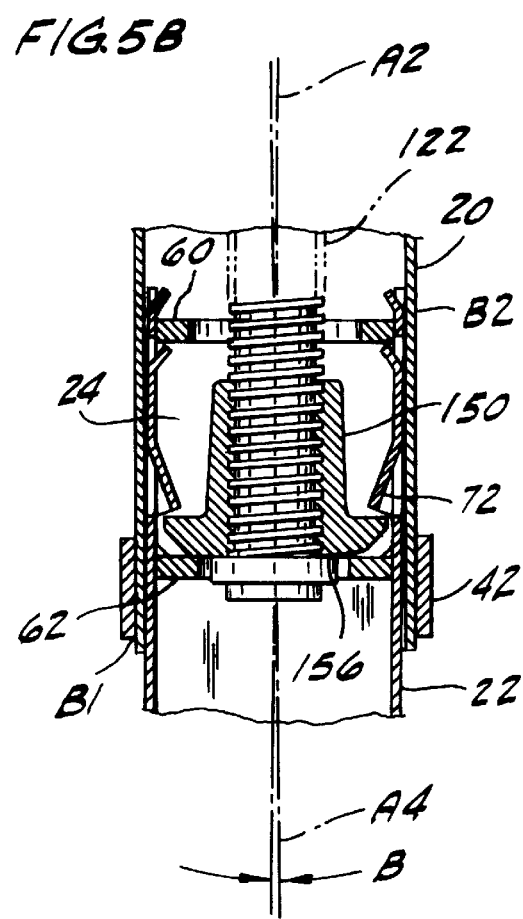

LANDING GEAR

BACKGROUND OF THE INVENTION

This invention relates generally to landing gear for supporting a vehicle, and more particularly to landing gear for supporting a semitrailer adjacent its forward end when the trailer is uncoupled from a tractor used to pull the trailer.

Landing gear of the present invention is especially, but not exclusively, suited for semitrailers equipped with air suspensions, such as the air suspension shown in co-assigned U.S. Pat. No. 5,470,096. Suspensions of this type have air bladders connected between the trailer frame and the trailer axle to support the frame and isolate the trailer contents from shocks caused by rough roadway. These bladders are filled with air from a compressed air supply, such as a compressor on board the tractor used to pull the trailer. The bladders are filled with more air when the trailer is loaded than when it is empty to compensate for the increased weight of the load. If the trailer load is increased when the air supply is shut off, such as may occur when the trailer is loaded at a loading dock, the trailer tends to "walk" or move forward or rearward due to certain design features of the suspension. Similarly, a trailer sitting in a parked position for an extended period of time tends to move as air bleeds from the suspension. When the trailer moves and its forward end is supported by landing gear, bending loads are applied to the landing gear. These loads can damage the landing gear, particularly the threads on an internal screw shaft used to raise and lower the landing gear. Damage to these threads tends to make raising and lowering the landing gear more difficult. Although trailer "walk" can be avoided by venting air from the suspension so suspension movement is reduced, drivers often fail to take this precaution before parking the trailer or before loading or unloading it.

Reference may be made to U.S. Pat. Nos. 4,903,977 and 5,423,518 for examples of prior art relating to landing gear of the general type of this invention.

SUMMARY OF THE INVENTION

Among the several objects of this invention may be noted the provision of landing gear which is highly resistant to damage caused by trailer "walk"; the provision of such landing gear which is made from thin gauge tubular metal stock; the provision of such landing gear which is economical to manufacture; and the provision of such landing gear which is light-weight.

Briefly, the landing gear of this invention comprises a body for attachment to the vehicle, and a tubular leg carried by the body and having a sliding fit with the body for up and down movement relative to the body. The landing gear further comprises a mechanism for slidably moving the leg up and down relative to the body. The mechanism comprises a nut inside the tubular leg having a threaded bore, an upper bulkhead extending across the inside of the leg adjacent the upper end of the leg, and a lower bulkhead extending across the inside of the leg below the upper bulkhead for supporting the nut in a generally fixed position relative to the leg between the upper and lower bulkheads. Both the upper and lower bulkheads include openings aligned with the threaded bore of the nut. The mechanism also includes a screw shaft in threaded interconnection with the threaded bore of the nut and extending axially in the tubular leg, and a bearing in the body above the leg journalling the screw shaft for rotation on its axis. The screw shaft extends downward from the bearing through the nut and through the openings in the upper and lower bulkheads so that rotation of the screw shaft in one direction is operable to move the leg upward relative to the body and rotation of the screw shaft in an opposite direction is operable to move the leg downward relative to the body.

In another aspect, the landing gear comprises a body for attachment to a vehicle and an elongate leg slidably attached to the body for longitudinal movement relative to the body between a retracted position and an extended position. The leg has a foot at its lower end for engaging the ground when the leg is in the extended position. The landing gear further comprises a mechanism for moving the leg between the extended and retracted positions. The mechanism comprises upper and lower spaced bulkheads affixed to the leg for strengthening the leg against lateral loads. The upper bulkhead is positioned adjacent the upper end of the leg. The mechanism also comprises a nut having a threaded bore mounted on the leg between the upper and lower bulkheads so the nut is substantially prevented from rotating about the longitudinal axis of the leg and the nut and lower bulkhead are permitted to rock with respect to each other. In addition, the mechanism comprises a screw shaft rotatably mounted on the body and threadably interengaged with the threaded bore of the nut. Lateral loads on the leg are transmitted to the body through the upper and lower bulkheads so the nut and shaft are substantially free of lateral loading from the leg.

In yet another aspect, the landing gear comprises a tubular body for attachment to a vehicle. The body has a hollow interior and an opening extending into the hollow interior. The landing gear also comprises an elongate leg slidably received through the opening into the hollow interior of the tubular body for longitudinal movement relative to the body between a retracted position and an extended position. The leg having a foot at its lower end for engaging the ground when the leg is in the extended position. The landing gear also comprises a mechanism for moving the leg between the extended and retracted positions. The mechanism comprises a nut having a threaded bore mounted on the leg so the nut is substantially prevented from rotating about the longitudinal axis of the leg and the nut and leg are permitted to rock from side to side with respect to each other through an angle $\alpha$ as measured between the longitudinal axis of the leg and the axis of the nut. The mechanism also comprises a screw shaft in threaded interconnection with the threaded bore of the nut and rotatably mounted on the body in a fixed axial position within the hollow interior of the body. In addition, the mechanism comprises a upper bulkhead affixed to the leg adjacent an upper end of the leg for strengthening the leg against lateral loads and a lower bulkhead affixed to the leg at a position spaced below the upper bulkhead. The upper and lower bulkheads prevent the leg from rocking from side to side within the hollow interior of the body through an angle greater than angle $\alpha$ as measured from the longitudinal axis of the leg.

Other objects and features of this invention will be in part apparent and in part pointed out hereinafter.

BRIEF DESCRIPTION OF THE DRAWINGS

FIG. 4 is a fragmentary cross section similar to FIG. 3 showing the gear in an extended position;

FIG. 5A is a fragmentary cross section of a landing gear leg showing a nut and the leg rocked with respect to each other about an angle α as measured between a longitudinal axis of the leg and an axis of the nut; and FIG. 5B is a fragmentary cross section showing a leg rocked within a landing gear body about an angle β relative to the longitudinal axis of the body.

Corresponding parts are designated by corresponding reference characters throughout the several views of the drawings.

DETAILED DESCRIPTION OF THE PREFERRED EMBODIMENT

Figure 1:
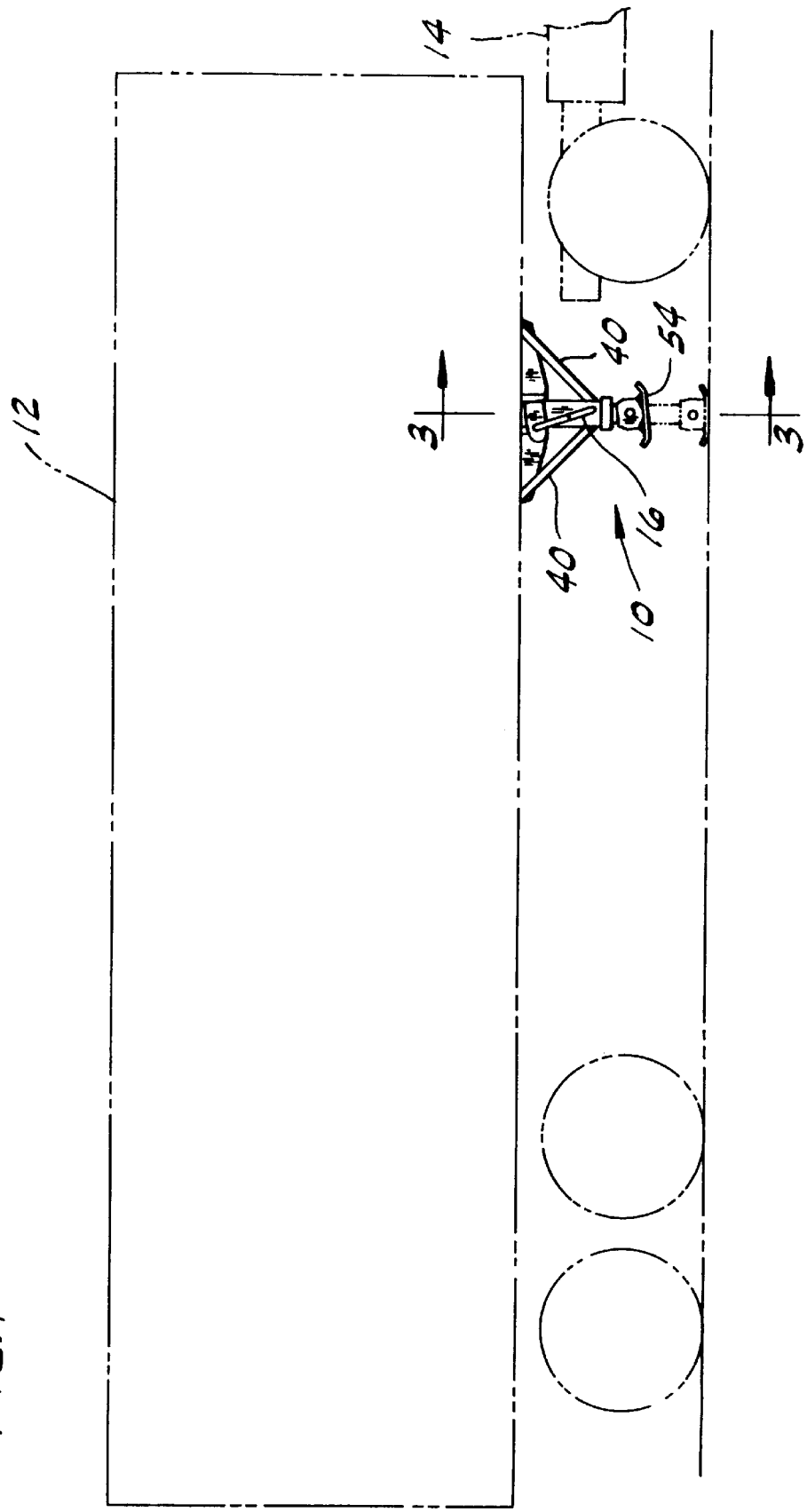
FIG. 1 is a side elevation of a landing gear of the present invention shown in relation to a fragmentary schematic of a tractor and semitrailer in phantom.
Figure 2:
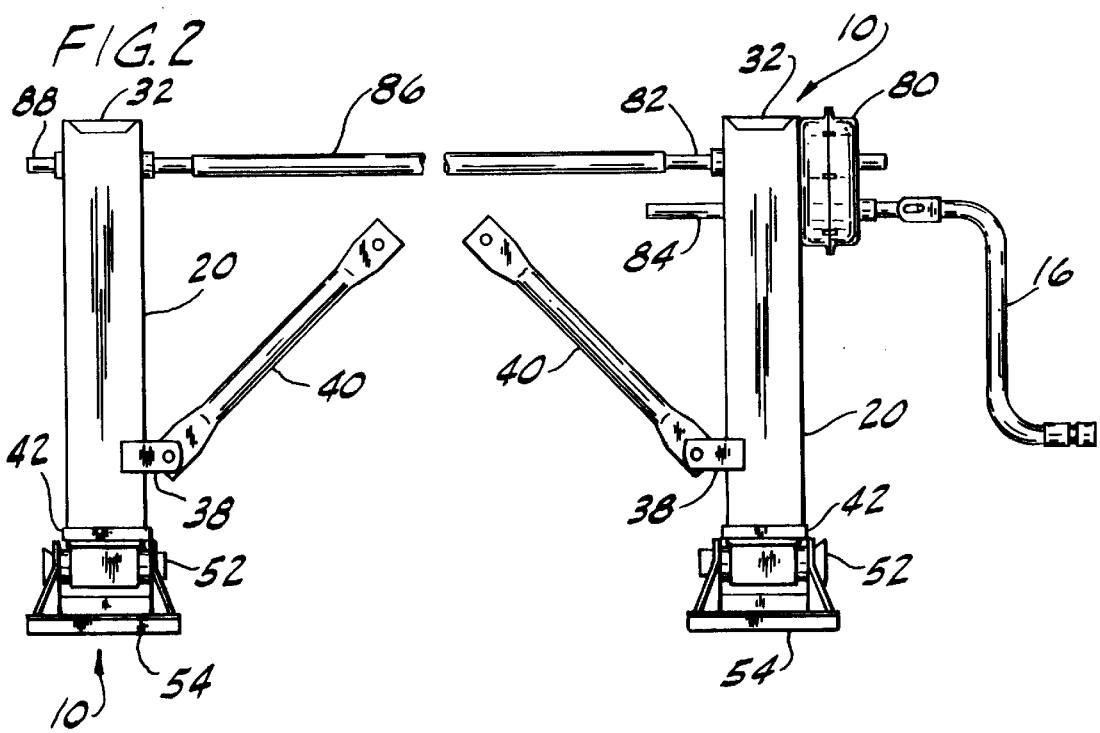
FIG. 2 is a rear elevation of a pair of landing gear.

Referring now to the drawings, and first more particularly to FIG. 1, a landing gear of the present invention, generally indicated by the reference numeral 10, is used for supporting a vehicle such as a semitrailer 12 (shown in phantom) when uncoupled from a tractor 14 (partially shown in phantom). The landing gear 10 is attached in conventional fashion to the underside of the trailer 12, near one side and toward its forward end. As illustrated in FIG. 2, a similar landing gear 10 is provided near the opposite side of the trailer 12. The landing gear 10 is operated by turning a crank 16 to move the landing gear between an extended position (shown in phantom in FIG. 1) in which the landing gear engages the ground to support the trailer 12 when uncoupled from the tractor 14 and a retracted position (shown in solid lines in FIG. 1) in which the landing gear clears the ground for transporting the trailer with the tractor.

Figure 3:
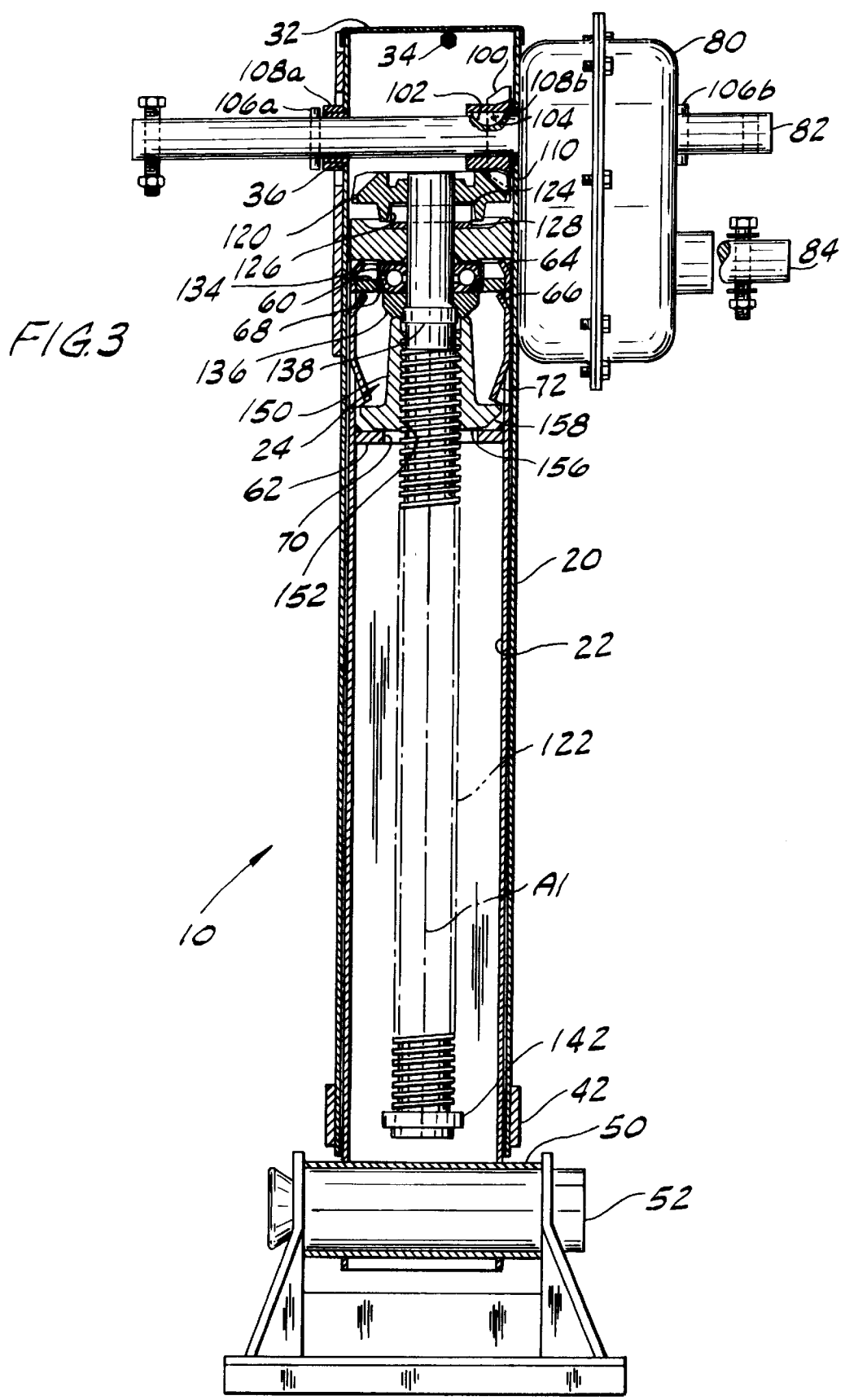
FIG. 3 is a cross section of the landing gear taken in the plane of line 3—3 of FIG. 1 showing the gear in a retracted position.

As illustrated in FIGS. 3 and 4, the landing gear 10 generally comprises a tubular body 20, a tubular leg 22 telescopically received by the body, and a mechanism (generally designated by 24) for slidably moving the leg up and down relative to the body toward retracted and extended positions, respectively. The body 20 of the preferred embodiment is made from tubular metal stock having a generally square cross-section about 4⅜ inches wide. Further, the body 20 has a length of about 25 to 30 inches. A conventional mounting plate 30 is attached to the body 20 adjacent its upper end for attaching the landing gear 10 to the undercarriage of the trailer 12 so it extends vertically downward from the bottom of the trailer. A sheet metal cover 32 is attached with screws 34 to the upper end of the body 20 to prevent debris, which could potentially foul the mechanism 24, from entering the hollow interior of the body. The cover 32 includes a gasket (not shown) on its underside to seal the interface between the cover and body 20. Holes 36 extend horizontally through the body 30 near its upper end for accommodating the mechanism 24 as will be explained in greater detail below. Fittings 38 (FIG. 2) may be welded to the body 20 toward its lower end for attaching struts 40 (FIG. 1) to the body. The struts 40 extend from the body 20 to the undercarriage of the trailer 12 for bracing the landing gear 10, as is conventional in the art. Moreover, a band 42 surrounds the lower end of the body 20 for strengthening the body against lateral loads such as those produced during trailer walk.

As further illustrated in FIGS. 3 and 4, the leg 22 of the preferred embodiment is made from tubular metal stock having a generally square cross-section about 4 inches wide. In addition, the leg 22 of the preferred embodiment has a wall thickness of about 0.140 inches and a length of about 17 to 53 inches. The leg 22 slides in the hollow interior of the tubular body 20 for longitudinal movement relative to the body between the stated retracted and extended positions. A sleeve 50 extends across the leg 22 adjacent its lower end for accepting a connector pin 52 of a foot or shoe 54 which engages the ground when the leg is in its extended position. Although a sand shoe is shown in the figures, other types of shoes such as a shock foot or a cushion foot as described in co-assigned U.S. Pat. No. 4,824,136 are also envisioned as being within the scope of the present invention. When these other types of shoes 54 are used, the sleeve 50 may be omitted and the shoes may be connected to the leg 22 by alternate conventional means.

Two bulkheads 60, 62 extend horizontally across the inside of the leg 22 near its upper end for strengthening the leg against lateral loads and for supporting portions of the mechanism 24 as will be explained in greater detail below. The lower bulkhead 62 extends horizontally across the hollow interior of the leg 22 and is welded in a fixed axial position with respect to the leg so the bulkhead is positioned inside the band 42 on the body 20 when the leg is extended. Tabs 64, 66 formed in the side walls of the leg 22 project inwardly above and below the upper bulkhead 60 to hold the bulkhead inside the leg in a substantially fixed axial position adjacent the upper end of the leg 22. Other means (e.g., spot welding) may be used to hold the upper bulkhead in place without departing from the scope of the present invention. Openings 68, 70 in the upper and lower bulkheads 60, 62, respectively, permit portions of the mechanism 24 to extend through the bulkheads. Additional tabs 72 project inwardly from the side walls of the leg 22 so they engage a portion of the mechanism 24 as the leg is retracted.

As shown in FIG. 2, a conventional speed reduction gearbox 80 is mounted on the body 20 at its upper end on the side opposite the mounting plate 30 for providing mechanical advantage when moving the leg 22 between its extended and retracted positions. The gearbox 80 includes an output shaft 82 and an input shaft 84. Gears (not shown) are mounted on the shafts 82, 84 inside the gearbox 80 so their teeth interengage and the output shaft turns in response to rotation of the input shaft. By moving the input shaft 84 axially, different gears are engaged to change the gear ratio of the gearbox 80. Thus, the gear ratio of the gearbox 80 may be shifted between a low gear for lifting as much as 60,000 pounds or more, and a high gear for lifting the leg more quickly. The crank 16 (FIG. 1) provides additional mechanical advantage for turning the input shaft 84. The gearbox 80 may also include a conventional idler shaft and gears (not shown) positioned between the input shaft 84 and output shaft 82. When two landing gear devices 10 are paired as shown in FIG. 2, a connector tube 86 may be used to connect the output shaft 82 of a gearbox 80 attached to one landing gear with a slave shaft 88 of the other landing gear so the legs of both devices may be simultaneously extended or retracted.

As illustrated in FIGS. 3 and 4, the output shaft 82 (or, alternatively, the slave shaft 88 as illustrated in FIG. 2) extends through the holes 36 in the body 20. A bevel pinion 100 is mounted on the output shaft 82 inside the body 20 using a conventional seat 102 and key 104 to prevent the pinion from turning on the shaft. Two roll pins 106a, 106b extend through the output shaft 82 on opposing sides of the body 20 and gearbox 80 to retain the output shaft in position relative to the body. Bushings 108a, 108b positioned in the holes 36 allow the shaft to turn freely and reduce wear on the shaft and body. Likewise, a thrust washer 110 mounted on the shaft 82 between the bevel pinion 100 and body 20 spaces the pinion teeth from the body and reduces wear between the pinion and body.

The bevel pinion 100 meshes with a bevel gear 120 mounted on a vertical screw shaft 122 extending downward through the center of the landing gear body 20. A grooved pin 124 extends through the shaft 122 and a slot 126 formed in the back (underside) of the bevel gear 120 receives the grooved pin to prevent the gear from turning on the shaft. A thrust washer 128 positioned immediately below the grooved pin 124 rests on a bearing block 130 which is welded inside the body 20 to support the shaft 122 in a generally fixed longitudinal position with respect to the body. The thrust washer 128 reduces wear between the pin 124 and the bearing block 130. The bearing block 130 also acts as a bushing to center the shaft 122 in the body 20. A ball thrust bearing 134 mounted on the shaft 122 below the bearing block 130 journals the shaft 122 for rotation on its axis A1, and a collar 136 mounted on the shaft 122 below the bearing distributes loads from the shaft to the bearing. The shaft 122 is formed with a shoulder 138 below the collar 136 which prevents the collar from moving axially downward along the shaft. Thus, the shaft 122 is free to turn about its axis A1 as the output shaft 82 turns, but cannot move upward or downward with respect to the body 20. Below the shoulder 138, the shaft 122 is formed with screw threads (e.g., 29° acme screw threads). A grooved pin 142, installed through the shaft 122 adjacent its lower end, acts as a stop to limit the travel of the landing gear 10 as will be explained below. Grease fittings and passages (not shown) extend through the body adjacent the bevel gear 120 and bearing block 130 to lubricate the bearing surfaces of the mechanism 24.

A nut 150 having a bore 152 threaded with screw threads complementary to those on the shaft is mounted between the upper and lower bulkheads, 62, 60, respectively. The nut 150 has a generally square base 158 which is sized to prevent the nut from turning within the leg 22 about its longitudinal axis. As illustrated in FIGS. 3 and 4, the screw shaft 122 extending downward from the thrust bearing 134 threadably interengages the threaded bore 152 of the nut 150 so the nut translates along the shaft as the shaft rotates. The lower bulkhead 62 supports the nut 150 against downward movement relative to the leg and the tabs 72 projecting inwardly from the side walls of the leg 22 prevent the nut from moving substantially upward relative to the leg. Thus, the nut 150 is held in a generally fixed position relative to the leg 22 so the leg moves up and down relative to the body 20 as the shaft 122 turns in response to rotation of the output shaft 82.

As illustrated in FIG. 5A, the tabs 72 projecting inwardly from the side walls of the leg 22 are sufficiently spaced from the lower bulkhead 62 to permit a relative rocking motion between the nut 150 and the leg 22 (i.e., about the lateral axes of the nut and leg). In addition, the width of the base 158 of the nut 150 is smaller than the distance between the side walls of the leg 22 to permit the nut to shift side-to-side within the leg as they rock with respect to each other. Further, the bottom face 156 of the base 158 of the nut 150 is crowned so it engages the corner of the lower bulkhead 62 surrounding the opening 70. Thus, the nut 150 and bulkhead 62 are free to rock with respect to each other through an angle $\alpha$ as measured between the longitudinal (vertical) axis A2 of the leg and the axis A3 of the nut.

Similarly, as illustrated in FIG. 5B, the leg 22 is free to rock in the body 20 due to the clearance between the body and the leg. However, the leg 22 only rocks through an angle $\beta$, as measured from the longitudinal (vertical) axis A4 of the body, before the leg contacts the body 20 at locations B1 and B2. The clearance between the body 20 and leg 22 is sized to prevent angle $\beta$ from exceeding angle $\alpha$. Moreover, the upper bulkhead 60 strengthens the leg 22 against deformation to ensure that angle $\beta$ does not exceed angle $\alpha$. If the upper bulkhead 60 were not present, the upper end of the leg 22 could collapse more easily due to the load applied at location B2, thereby allowing the leg to rock farther. If the leg were permitted to rock through an angle greater than angle $\alpha$, then bending loads could be transmitted through the nut 150 to the shaft 122 such that the threads on both the nut and shaft could be damaged. However, the upper bulkhead 60 reinforces the upper end of the leg 22 to prevent its collapse. Thus, the upper bulkhead 60 reduces the possibility of damaging the screw threads.

Because the bottom face 156 of the nut 150 is crowned, the distance from the centerline of the nut and the line of contact between the nut and lower bulkhead 62 does not change significantly as the nut and leg 22 rock with respect to each other. If the nut 150 were not crowned, the loads applied to the nut by the lower bulkhead 62 would shift to an edge of the base 158 as the nut and the lower bulkhead rocked with respect to each other. However, because the bottom face 156 is crowned, the moment arm remains equal to the maximum distance between the shaft axis A1 and the edge of the opening 70 in the lower bulkhead 62. Thus, the moment arm applied to the nut by the bulkhead 62 does not increase significantly as the leg rocks within the body 20. Therefore, the bending load applied to the nut 150 by the lower bulkhead 62 does not increase significantly.

Furthermore, the lower bulkhead 62 and band 42 strengthen the leg 22 and body 20 against deformation when lateral loads are applied to the landing gear 10 and the leg is fully extended. The lateral loads are greatest when the leg is fully extended. Because the lower bulkhead 62 and band 42 strengthen the leg 22 and body 20, they are less likely to be damaged. Further, because the bulkheads 60, 62 and band 42 strengthen the leg 22 and body 20 in the locations of highest potential loading, lighter gauge stock may be used to form the leg and body than could otherwise be used. For example, tubular stock having a wall thickness of approximately 0.140 inches rather than 0.180 inches may be used. As a result, the weight of the landing gear is reduced, and the costs associated with manufacturing the landing gear and operating trailers having the landing gear are reduced.

The grooved pin 142 and opening 70 in the lower bulkhead 62 are sized to provide sufficient clearance between the pin and opening. If the pin 142 interferes with the bulkhead 62, the shaft 122 may be bent and/or the screw threads on the shaft and nut 150 may be damaged. By sizing the opening 70 and pin 142 to provide clearance between them, these undesirable results are avoided.

To use the landing gear 10 of the present invention, the trailer 12 is moved to the desired parking location, such as adjacent a loading dock. Air is released from the trailer 12 suspension to reduce the suspension movement due to load changes and air loss, and the trailer wheels are chocked in a conventional manner. Once these precautions are taken, the gearbox 80 on the landing gear 10 may be shifted into high gear before turning the crank 16 to move the leg 22 quickly down toward its extended position. Once the foot 54 touches the ground, the gearbox 80 is shifted to low gear and the crank 16 is turned to lift the forward end of the trailer 12 off the tractor 14 so it is supported by the landing gear 10. As the crank 16 is turned, the output shaft 82 of the gearbox 80 turns so the bevel pinion 100 drives the bevel gear 120 to rotate the shaft 122 in the body 20. The nut 150 translates along the shaft 122 as the shaft rotates to lower the leg 22 toward the ground. Once the leg 22 is extended so the foot 50 contacts the ground, the tractor 14 may be disconnected from the trailer 12 if desired.

Even though air is bled from the trailer 12 suspension and the wheels are chocked, the trailer will travel slightly forward and/or rearward as it is unloaded and/or loaded. This travel causes lateral loads to be applied to the landing gear 10 from the ground. However, as previously explained, the unique construction of the landing gear 10 of the present invention strengthens the body 20 and leg 22 to prevent them from bending. Further, the construction prevents transfer of these loads to the threads of the shaft 122 and nut 150 which prevents damage to these components.

When the trailer 12 is to be moved, the tractor 14 is reconnected to the trailer and the landing gear crank 16 is rotated in the opposite direction to move the leg 22 upward into the hollow interior of the body 20 to the retracted position. The mechanism 24 operates to translate the nut 150 along the shaft 122 as the shaft rotates to raise the leg 22. Thus, rotation of the screw shaft 122 in one direction moves the leg 22 down relative to the body 20 toward its extended position and rotation of the screw shaft in the opposite direction moves the leg up relative to the body toward its retracted position.

While the present invention has been described by reference to a specific embodiment, it should be understood that modifications and variations of the invention may be constructed without departing from the scope of the invention defined in the following claims.

What is claimed is:

1. Landing gear for supporting a vehicle comprising:
   a body for attachment to the vehicle;
   a tubular leg carried by the body and having a sliding fit with the body for up and down movement relative to the body as attached to the vehicle; and
   a mechanism for slidably moving the leg up and down relative to the body comprising:
     a nut inside the tubular leg having a threaded bore therethrough;
     a screw shaft in threaded interconnection with the threaded bore of the nut and extending axially in the tubular leg;
     an upper generally horizontal bulkhead extending across the inside of the leg adjacent the upper end of the leg for limiting deformation of the upper end of the leg and thereby preventing damage to the nut and shaft when the leg rocks from side to side with respect to the body;
     a lower generally horizontal bulkhead affixed to the leg and extending across the inside of the leg below the upper bulkhead for supporting the nut in a generally fixed position relative to the leg between the upper and lower bulkheads;
     openings in the upper and lower bulkheads aligned with the threaded bore through the nut;
     a bearing in the body above the leg journalling the screw shaft for rotation on its axis, the screw shaft extending down from the bearing through the nut and through the openings in the upper and lower bulkheads whereby rotation of the screw shaft in one direction is operable to move the leg upward relative to the body and rotation of the screw shaft in an opposite direction is operable to move the leg downward relative to the body.

2. Landing gear as set forth in claim 1 wherein said nut has a crowned bottom face rockingly engageable with the lower bulkhead.

3. Landing gear as set forth in claim 1 wherein the upper bulkhead is held in a substantially fixed axial position with respect to the leg.

4. Landing gear as set forth in claim 3 wherein the leg has side walls which project laterally inward to hold the upper bulkhead in said substantially fixed axial position.

5. Landing gear as set forth in claim 4 wherein the side walls of the leg project laterally inward to hold the nut against substantial upward movement away from the lower bulkhead.

6. Landing gear as set forth in claim 5 wherein said bearing is mounted on the body in a fixed position above the tubular leg.

7. Landing gear as set forth in claim 6 wherein said body comprises a metal tube.

8. Landing gear as set forth in claim 7 wherein said tubular leg has a wall thickness of about 0.14 in.

9. Landing gear for supporting a vehicle comprising:
   a body for attachment to the vehicle;
   an elongate leg slidably attached to the body for longitudinal movement relative to the body between a retracted position and an extended position, the leg having upper and lower ends and a foot on its lower end for engaging the ground when the leg is in the extended position; and
   a mechanism for moving the leg between said extended and retracted positions, the mechanism comprising:
     upper and lower spaced bulkheads affixed to the leg for strengthening the leg against lateral loads, said upper bulkhead being positioned adjacent the upper end of the leg;
     a nut having a threaded bore therethrough mounted on the leg between said upper and lower bulkheads so that the nut is substantially prevented from rotating about the longitudinal axis of the leg and the nut and lower bulkhead are permitted to rock with respect to each other; and
     a screw shaft rotatably mounted on the body and threadably interengaged with the bore of the nut whereby rotation of the screw shaft in one direction is operable to move the leg up toward said retracted position and rotation of the screw shaft in an opposite direction is operable to move the leg down toward said extended position, wherein lateral loads on the leg are transmitted to the body through said upper and lower bulkheads so that the nut and shaft are substantially free of lateral loading from the leg.

10. Landing gear as set forth in claim 9 wherein the body is formed from tubular stock having a hollow interior, and the leg is slidably received within the hollow interior of the body for movement relative to the body between said retracted and extended positions.

11. Landing gear as set forth in claim 10 wherein the leg is formed from tubular stock having a hollow interior, and said upper and lower spaced bulkheads are held in substantially fixed axial positions within the hollow interior of the leg.

12. Landing gear as set forth in claim 11 wherein the leg has side walls which project laterally inward to hold said upper bulkhead in said substantially fixed axial position.

13. Landing gear as set forth in claim 12 wherein the side walls of the leg project laterally inward to hold the nut against substantial movement away from said lower bulkhead.

14. Landing gear as set forth in claim 9 further comprising a bearing mounted on the body in a fixed position above the tubular leg for journalling the screw shaft for rotation on its axis.

15. Landing gear for supporting a vehicle comprising:
   a tubular body for attachment to the vehicle, the body having a hollow interior and an opening extending into the hollow interior;
   an elongate leg slidably received through the opening into the hollow interior of the tubular body for longitudinal movement relative to the body between a retracted position and an extended position, the leg having upper and lower ends and a foot at the lower end for engaging the ground when the leg is in the extended position; and a mechanism for moving the leg between said extended and retracted positions, the mechanism comprising:

a nut having a threaded bore therethrough mounted on the leg so that the nut is substantially prevented from rotating about the longitudinal axis of the leg and the nut and leg are permitted to rock from side to side with respect to each other through an angle $\alpha$ as measured between the longitudinal axis of the leg and the axis of the nut;

a screw shaft in threaded interconnection with the threaded bore of the nut and rotatably mounted on the body in a fixed axial position within the hollow interior of the body whereby rotation of the screw shaft in one direction is operable to move the leg up toward said retracted position and rotation of the screw shaft in an opposite direction is operable to move the leg down toward said extended position;

an upper bulkhead affixed to the leg adjacent the upper end of the leg for strengthening the leg against lateral loads; and a lower bulkhead affixed to the leg at a position spaced below the upper bulkhead, said upper and lower bulkheads preventing the leg from rocking from side to side within the hollow interior of the body through an angle greater than angle $\alpha$ as measured from the longitudinal axis of the body.

16. Landing gear as set forth in claim 15 wherein the body includes a band surrounding the opening for strengthening the body against lateral loads, the band being positioned so that said lower bulkhead is aligned with the band when the leg is in the extended position.

17. Landing gear as set forth in claim 15 wherein said nut has a crowned bottom face for rocking engagement with said lower bulkhead.

18. Landing gear as set forth in claim 15 wherein the body and the leg are formed from tubular stock having a hollow interior, and said upper and lower spaced bulkheads are held in substantially fixed axial positions within the hollow interior of the leg.

* * * * *